United States Patent [19]

Goodman

[11] Patent Number: 4,589,739
[45] Date of Patent: May 20, 1986

[54] TELEVISION MAGNIFICATION APPARATUS

[76] Inventor: Steven Goodman, 85 Oak St., Norwood, N.J. 07648

[21] Appl. No.: 773,800

[22] Filed: Sep. 9, 1985

[51] Int. Cl.⁴ .............................................. G02B 3/08
[52] U.S. Cl. ................................... 350/452; 358/237; 358/250
[58] Field of Search .................. 350/452; 353/72; 358/250, 231, 237

[56] References Cited

U.S. PATENT DOCUMENTS

| | | | |
|---|---|---|---|
| D. 257,039 | 9/1980 | Petrie | D14/84 |
| 2,260,228 | 10/1941 | Moller et al. | |
| 3,525,807 | 8/1970 | Herriott et al. | |
| 3,800,085 | 3/1974 | Ambats et al. | |
| 4,074,322 | 2/1978 | Cammilleri | 358/237 |
| 4,082,433 | 4/1978 | Appeldorn et al. | 350/452 |
| 4,309,074 | 1/1982 | Granieri | |
| 4,391,495 | 7/1983 | Mazurkewitz | 350/452 |
| 4,439,027 | 3/1984 | Shioda et al. | 353/77 |
| 4,457,594 | 7/1984 | Hodges | 350/452 |

FOREIGN PATENT DOCUMENTS 680916 10/1952 United Kingdom .

*Primary Examiner*—John K. Corbin
*Assistant Examiner*—P. Dzierzynski
*Attorney, Agent, or Firm*—Peter L. Berger

[57] ABSTRACT

Apparatus for magnifying and projecting an image from a screen of a television receiver, includes a housing supported on the front face of the television receiver, a reflecting mirror secured to the rear wall of the housing at a 45 degree angle with respect to the screen of the television receiver, and a lens housing slidably received within the housing and including only two Fresnel lenses for magnifying and projecting the image from the screen, the lenses being substantially flat and parallel to each other, and spaced apart a predetermined fixed distance, whereby a sharp, enlarged image is obtained.

13 Claims, 3 Drawing Figures

TELEVISION MAGNIFICATION APPARATUS

BACKGROUND OF THE INVENTION

The present invention relates generally to apparatus for magnifying the image from a cathode ray tube and, more particularly, is directed to a television magnification apparatus providing improved resolution.

Television projection systems in which the image from the screen of a conventional television receiver is magnified and then projected on a flat surface are well known in the art. One such system uses a single Fresnel lens to magnify and project the image.

For example, such a system is shown and described in U.S. Pat. No. 4,074,322. As shown and described therein, a fixed housing is removably mounted to the front of a television receiver. A movable housing is slidably mounted within the fixed housing and contains a single Fresnel lens and at least one reflecting mirror. See also U.S. Pat. Nos. 2,260,228; 3,525,807 and 4,439,027 and British Patent No. 680,916 for other single Fresnel lens systems.

With single Fresnel lens systems, however, it becomes difficult to obtain clear and sharp projected images, regardless of focusing adjustments that are provided by permitting sliding movement of the single Fresnel lens, for example, by the movable housing of U.S. Pat. No. 4,074,322. See also U.S. Design Pat. No. 257,039 with respect to a movable housing.

Other systems have been provided which use three or more Fresnel lenses. For example, U.S. Pat. No. 4,457,594 requires the use of three Fresnel lenses, while U.S. Pat. No. 4,391,495 requires the use of five Fresnel lenses in a complicated arrangement. See also U.S. Pat. No. 3,800,085 which uses five irregularly configured lenses. Although it is possible that these systems may provide a clearer and sharper image than that provided by a single Fresnel lens system, the time required to manufacture and the cost of the assembly is greatly increased.

It will be noted that U.S. Pat. No. 4,309,074, which discloses a viewing screen designed to produce a three dimensional effect, uses two Fresnel lenses in back to back relation to form a conventional biconvex lens. Basically, the Fresnel lenses are thin and flexible, and are vibrated by acoustic waves to produce the three dimensional effect. However, there is no projection and magnification of an image, and the system is not used as a projection television.

OBJECTS AND SUMMARY OF THE INVENTION

Accordingly, it is an object of the present invention to provide apparatus for magnifying and projecting an image from a screen of a television receiver with sharpness and clarity.

It is another object of the present invention to provide apparatus for magnifying and projecting an image from a screen of a television receiver, in which there are only two Fresnel lenses.

In accordance with an aspect of the present invention, apparatus for magnifying and projecting an image from a screen of a television receiver, comprises only two Fresnel lenses for magnifying and projecting the image from the screen, the lenses being substantially flat and parallel to each other, and spaced apart a predetermined fixed distance; reflecting means for reflecting the image from the screen to the two Fresnel lenses; and housing means for supporting the two Fresnel lenses and the reflecting means with respect to the screen.

The above and other, objects, features and advantages of the present invention will become readily apparent from the following detailed description thereof which is to be read in connection with the accompanying drawings.

DETAILED DESCRIPTION OF A PREFERRED EMBODIMENT

Figure 1:
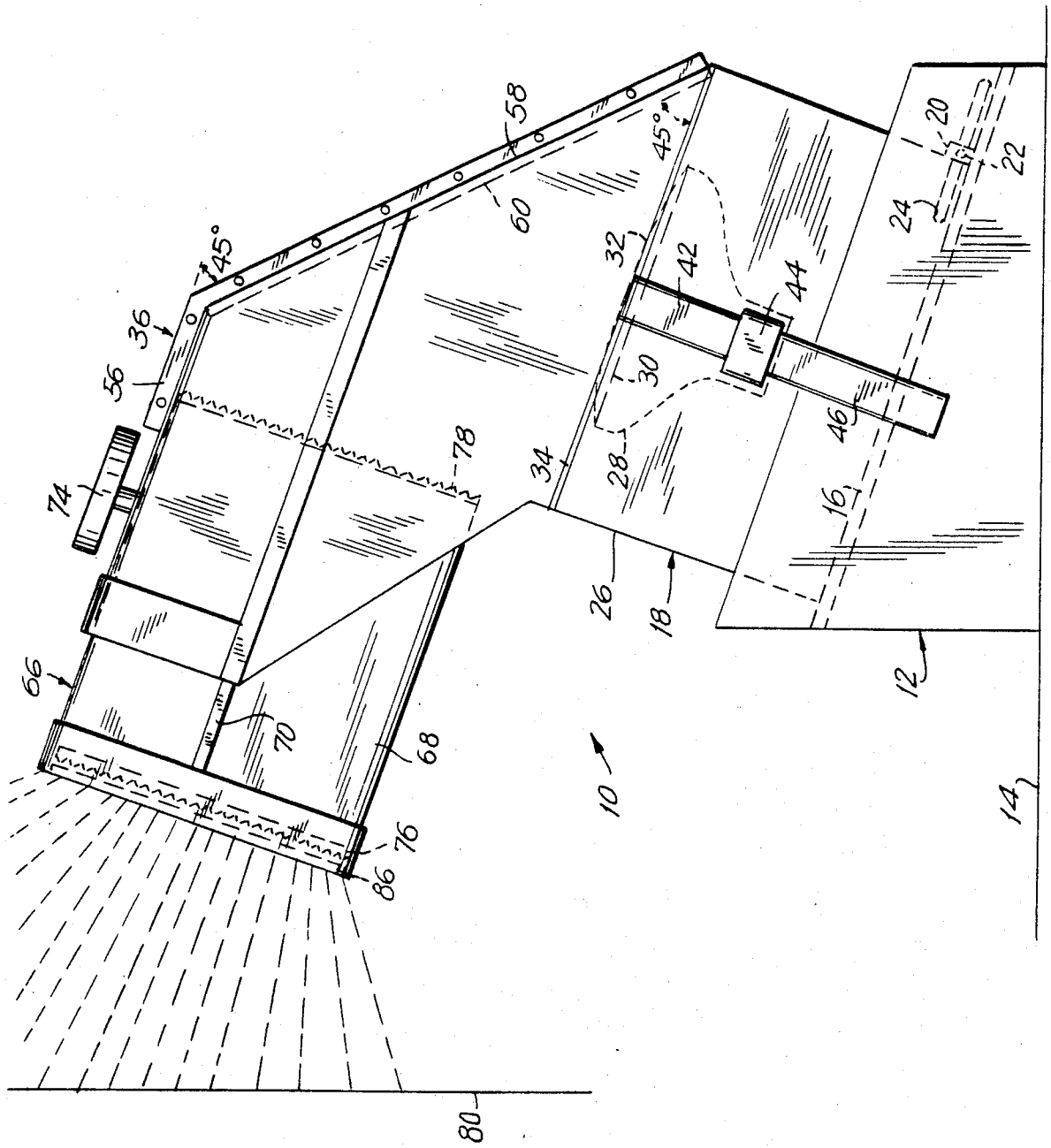
FIG. 1 is a schematic elevational view of television magnification apparatus according to the present invention.

Referring to the drawings in detail, and initially to FIG. 1 thereof, a television magnification apparatus 10 according to the present invention includes a base 12 which sits upon a floor or support 14. Base 12 includes an internal platform 16 which is preferably rearwardly inclined, as shown. A conventional television receiver 18 is positioned on platform 16. In this regard, a retaining wall 20 is positioned on platform 16 at the rear thereof and against which television receiver 18 abuts for positioning television receiver 18 substantially centrally on platform 16. To accommodate different size television receivers 18, retaining wall 20 can be moved along platform 16, and fixed at any desired location. For example, retaining wall 20 can be fixed at a desired position by bolts 22 or the like which extend through side walls of base 12 into corresponding ends of retaining wall 20. To adjust the position of retaining wall 20, slots 24 are provided in the side walls of base 12 through which bolts 22 extend. Accordingly, television receiver 18 can be supported within base 12 at a desired position.

Television receiver 18 is conventional and includes a housing 26 which contains a cathode ray tube (CRT) 28 having a flat screen 30 and a slightly arcuate glass face plate 32. Housing 26 has larger dimensions than screen 30 and glass face plate 32, and thereby provides a periphery 34 extending therearound. As clearly shown in FIG. 1, screen 30 and glass face plate 32 are positioned facing upwardly, preferably at a slight rearwardly directed angle, the purpose of which will be made clear from the discussion which follows. Although the present invention is not limited by the size of television receiver 18, it is preferable that television receiver 18 correspond to conventional television receivers which have screen sizes ranging from 13 inches to 19 inches, measured diagonally. The present invention can be used with black and white or color television receivers. In FIG. 1, the smallest television receiver 18 that can be used with the present invention is shown. With larger size television receivers 18, periphery 34 will have a greater outside dimension than that shown in FIG. 1.

Figure 2:
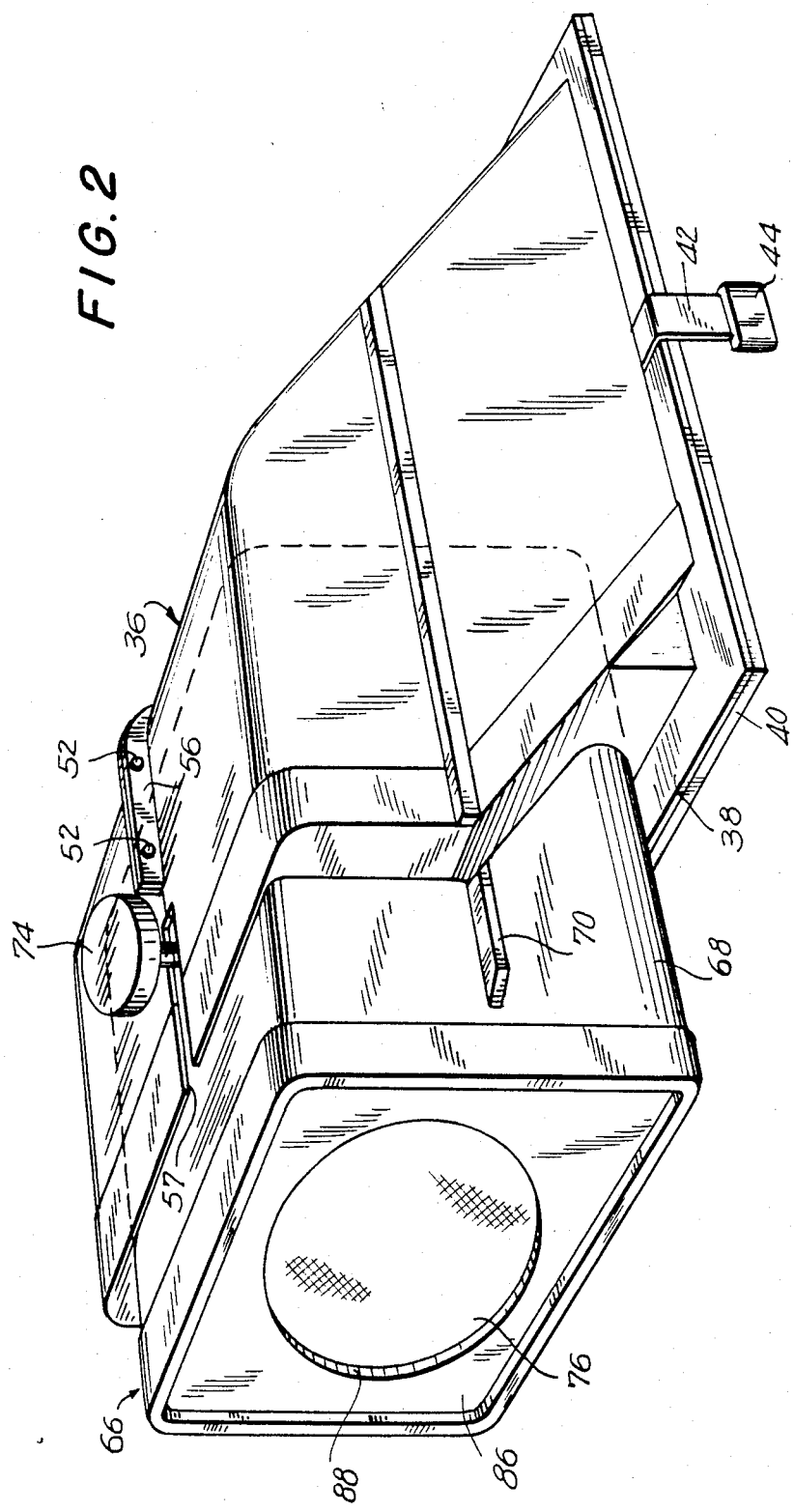
FIG. 2 is a perspective view of the portion of the television magnification apparatus of FIG. 1 that is positioned on the television receiver.
Figure 3:
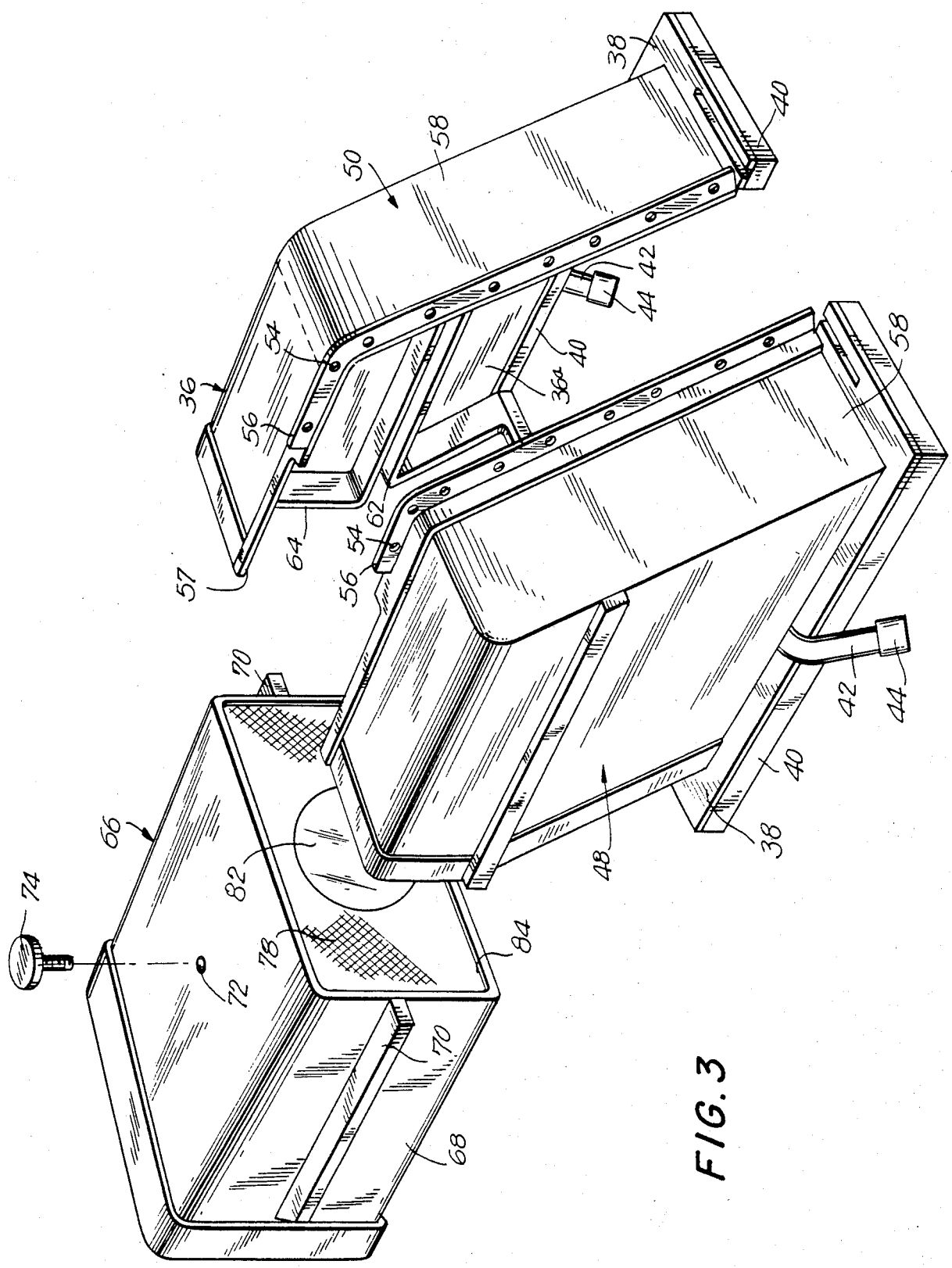
FIG. 3 is a blown apart perspective view of the television magnification apparatus of FIG. 2.

As shown in FIGS. 1-3, television magnification apparatus 10 also includes a housing 36, having a generally forwardly inclined configuration and which is generally square or rectangular in cross-section. As shown in FIGS. 2 and 3, housing 36 includes a peripheral base section 38 at the bottom thereof, with a protective layer 40 of sponge rubber, foam rubber or the like secured to the lower face of base section 38. In this manner, as shown in FIG. 1, housing 36 sits on periphery 34 of housing 26 of television receiver 18, without damaging the same. Of course, it will be appreciated that the sides of base section 38 will be spaced inwardly from the sides of periphery 34 of television receiver 18 so as not to enclose the channel changing knob or buttons of television receiver 18. Because FIG. 1 is a side elevational view, this is not shown.

In order to secure housing 36 to television receiver 18, a strap 42 is secured to opposite sides of base section 38 of housing 36, with a buckle 44 or other like securing device being secured at the free ends thereof. A strap 46 is secured to corresponding side walls of base 12. When housing 36 is mounted on television receiver 18, buckle 44 on each side of the apparatus secures corresponding straps 42 together to thereby secure housing 36 on television receiver 18. Preferably, buckles 44 have a snap release mechanism to permit easy tightening and release of the straps.

As shown in FIG. 3, housing 36 is preferably manufactured in two halves 48 and 50, which are secured together by bolts 52 (FIG. 2) which extend through holes 54 in external flanges 56, secured in opposing relation on each half 48 and 50. However, any other suitable securing means can be provided, and the invention is not limited to the particular means shown. When joined together, a narrow slot 57 is defined at the forward end of housing 36, the purpose of which will be made clearer from the description which follows.

The rear wall 58 of housing 36 is inclined with respect to screen 30, preferably at a 45 degree angle, and a reflecting mirror 60 is secured to the inner face thereof, as shown in FIG. 1. Thus, the image from screen 30 is reflected from mirror 60 to effectively change the direction thereof by 90 degrees.

Tracks 62 are secured to opposing inner walls 36a of housing 36, as shown in FIG. 3, and the front of housing 36 is cut-away to define a front opening 64, whereby a Fresnel lens assembly 66 can be slidably received within housing 36. Specifically, Fresnel lens assembly 66 includes a lens housing 68 having a generally square or rectangular configuration, with dimensions less than that of housing 36 to permit lens housing 68 to slide therein. In this regard, side rails 70 are secured to opposite side walls of lens housing 68, and slide within tracks 62 to slidably receive lens housing 68 within housing 36. Further, the upper wall of lens housing 68 includes a screw threaded aperture 72. Thus, when lens housing 68 is slidably received within housing 36, a securing bolt 74 extends through slot 57 in housing 36 into aperture 72 to secure lens housing 68 at a fixed position in housing 36.

In accordance with the present invention, a sharply defined image is obtained with only two Fresnel lenses 76 and 78, as shown in FIG. 1, which magnify and project a sharply defined enlarged image onto a flat surface 80, such as a wall, screen or the like. Fresnel lenses 76 and 78 are parallel and spaced apart a fixed distance from each other in lens housing 68, with the smooth surfaces thereof facing each other, that is, with the rough surfaces thereof facing away from each other, which is essential to the present invention. Fresnel lenses 76 and 78 are positioned at an angle of approximately 45 degrees with respect to mirror 60, and thereby at an angle of approximately 90 degrees with respect to screen 30. It will be appreciated that Fresnel lenses 76 and 78, besides magnifying and projecting the image from screen 30, also re-invert the image which was inverted by mirror 60. It is necessary that the forward most Fresnel lens 76 have a focal length greater than that of the rearward most Fresnel lens 78. Preferably, the forward most Fresnel lens 76 has a focal length of 770 mm and the rearward most Fresnel lens has a focal length of 470 mm.

Fresnel lenses 76 and 78 may be made of any suitable material, such as acrylic or the like. Suitable Fresnel lenses are manufactured by Edoka Kogyo Co., Ltd, Edoka Limited, 12-1, Arakawa 7-chome, Arakawa-ku, Tokyo, Japan, and include a circular lens section 82 and a square or rectangular supporting section 84, as shown in FIG. 3 in regard to Fresnel lens 78. In this regard, in order to avoid distortions in the projected image due to light passing through supporting sections 84 of Fresnel lenses 76 and 78, a light blocking diaphragm 86 made of an opaque material is provided in front of Fresnel lens 76. Diaphragm 86 has a central aperture 88 corresponding in size to lens sections 82 of Fresnel lenses 76 and 78 so as to block light passing through supporting sections 84. However, diaphragm 86 is positioned in close proximity to Fresnel lens 76 so as not to block any of the light passing through lens section 82 thereof.

In order to provide a six foot, or less, diagonally projected image, Fresnel lenses 76 and 78 are preferably fixed approximately 11 inches apart within lens housing 68, and the center of mirror 60 is separated a distance of approximately 4 ⅛ inches from screen 30. It will be noted that the latter dimension is not measured from glass face plate 32. Of course, the size of the image will depend on the distance of the entire assembly from flat surface 80, while slidable adjustment of lens housing 68 within housing 36 will only serve to focus the image and not enlarge the same.

In operation, the image from television receiver 18 is reflected from mirror 60, through Fresnel lenses 76 and 78, and through aperture 88 of diaphragm 86, onto flat surface 80. To enlarge the image, the entire assembly, including television receiver 18, is moved away from flat surface 80, and lens housing 68 is slidably adjusted within housing 36 to focus the image.

Thus, in accordance with the present invention, a sharply defined enlarged image is obtained, which can not be obtained with systems using only a single Fresnel lens. In addition, this sharply defined image is obtained by using only two Fresnel lenses 76 and 78 which are separated a fixed distance apart with their rough surface facing away from each other. It is therefore unnecessary to use three or more Fresnel lenses in a complicated arrangement as in the prior art, thereby reducing the cost and complexity thereof.

Having described a specific preferred embodiment of the present invention with reference to the accompanying drawings, it is to be appreciated that the present invention is not limited to that precise embodiment, and that various changes and modifications can be effected therein by one of ordinary skill in the art without departing from the spirit and scope of the invention as defined by the appended claims.

What is claimed is:

1. Apparatus for magnifying and projecting an image from a screen of a television receiver, comprising:
   only two circular Fresnel lenses for magnifying and projecting said image from said screen, said lenses being substantially flat and parallel to each other, and spaced apart a predetermined fixed distance generally greater than the approximate size of the lenses;

each Fresnel lens having a smooth surface and an opposite rough surface, and the rough surfaces of the two Fresnel lenses facing away from each other;

reflecting means for reflecting said image from said screen to said two Fresnel lenses; and housing means for supporting said two Fresnel lenses in said spaced apart relationship and said reflecting means with respect to said screen.

2. Apparatus for magnifying and projecting an image from a screen of a television receiver, comprising:

only two circular Fresnel lenses for magnifying and projecting said image from said screen, said lenses being substantially flat and parallel to each other, and spaced apart a predetermined fixed distance generally greater than the approximate size of the lenses;

each Fresnel lens having a smooth surface and an opposite rough surface, and the rough surfaces of the two Fresnel lenses facing away from each other;

reflecting means for reflecting said image from said screen to said two Fresnel lenses;

housing means for supporting said two Fresnel lenses in said spaced apart relationship and said reflecting means with respect to said screen; and lens support means for supporting said two Fresnel lenses in said housing means in a sliding relation with respect to said reflecting means to provide focusing of said image.

3. Apparatus according to claim 2; wherein said housing means includes opposing tracks, and said lens support means includes opposite rails which slide within said tracks to slidably support said lens support means in said housing means.

4. Apparatus according to claim 2; further comprising securement means for releasably fixing said lens support means at a desired position within said housing means.

5. Apparatus according to claim 4; wherein said securement means includes a screw threaded aperture in said lens support means, a slot in said housing means and a threaded member extending through said slot and screw threadedly received within said screw threaded aperture.

6. Apparatus according to claim 1; further comprising securement means for securing said housing means on said television receiver.

7. Apparatus according to claim 6; further comprising base means for supporting said television receiver; and wherein said securement means includes first straps secured to opposite sides of said base means, second straps secured to opposite sides of said housin9 means, and buckle means for releasably securing together respective first and second straps on said opposite sides to secure said housing means on said television receiver.

8. Apparatus according to claim 1; further comprising base means including platform means for supporting said television receiver at a slight rearwardly directed angle.

9. Apparatus according to claim 1; further comprising diaphragm means positioned in front of the forward most positioned Fresnel lens for blocking extraneous light.

10. Apparatus according to claim 1; wherein said television receiver includes a screen, and said reflecting means is positioned at an angle of approximately 45 degrees with respect to said screen.

11. Apparatus according to claim 10; wherein said Fresnel lenses are positioned at an angle of approximately 45 degrees with respect to said reflecting means and at an angle of approximately 90 degrees with respect to said screen.

12. Apparatus according to claim 1; wherein said television receiver includes a screen, said two Fresnel lenses are spaced apart a distance of approximately 11 inches, and the center of said reflecting means is spaced from said screen by a distance of approximately $4\frac{7}{8}$ inches.

13. Apparatus according to claim 1; wherein the rearward most Fresnel lens has a focal length of approximately 470 mm and the forward most Fresnel lens has a focal length of approximately 770 mm.

* * * * *